United States Patent [19]
Dean et al.

[11] Patent Number: 6,059,627
[45] Date of Patent: May 9, 2000

[54] METHOD OF PROVIDING UNIFORM EMISSION CURRENT

[75] Inventors: Kenneth A. Dean, Phoenix; Paul von Allmen, Mesa; Bernard F. Coll, Fountain Hills; Albert Alec Talin, Scottsdale, all of Ariz.

[73] Assignee: Motorola, Inc., Schaumburg, Ill.

[21] Appl. No.: 09/264,308

[22] Filed: Mar. 8, 1999

[51] Int. Cl.⁷ ...................................................... H01J 1/30
[52] U.S. Cl. ............................................. 445/24; 313/311
[58] Field of Search ......................... 445/24, 51; 313/311

[56] References Cited

U.S. PATENT DOCUMENTS

| | | | |
|---|---|---|---|
| 5,180,951 | 1/1993 | Dworsky et al. | 313/311 |
| 5,619,092 | 4/1997 | Jaskie | 313/309 |
| 5,686,791 | 11/1997 | Kumar et al. | 313/311 |
| 5,753,997 | 5/1998 | Jaskie | 313/336 |
| 5,757,114 | 5/1998 | Jaskie | 313/309 |
| 5,916,005 | 6/1999 | Baik et al. | 313/311 |

OTHER PUBLICATIONS

"Edge State in graphene ribbons: Nanometer size effect and edge shape dependence" By K. Nakdada, M. et al., *Physical Review B*, The American Physical Society, vol. 54, No. 24, Dec. 15, 1996, pp. 17954–17961.

*Primary Examiner*—Kenneth J. Ramsey
*Attorney, Agent, or Firm*—S. Kevin PIckens; Kevin D. Wills

[57] ABSTRACT

A method or providing uniform emission current from a plurality of electron emitters with a composite current voltage characteristic (620), which include surface states that provide resonant tunneling emission of electrons (260). Field emission device (200) is operated beyond a decrease in the increase of emission current (630) as shown in the composite current voltage characteristic (620) in order to provide uniform emission current.

20 Claims, 7 Drawing Sheets

METHOD OF PROVIDING UNIFORM EMISSION CURRENT

FIELD OF THE INVENTION

The present invention relates to the area of field emission devices, and more particularly, to a method of providing uniform emission current.

BACKGROUND OF THE INVENTION

It is desirable, in field emission devices, to achieve uniform emission current from groups of electron emitters. Uniform emission current is useful for achieving uniform brightness between pixels in a field emission display. Prior art methods of achieving uniform emission current include the use of resistive ballasting. The use of resistive ballasting introduces several extra processing steps in the fabrication of a field emission device, which increases the cost of producing a field emission device. Also, the use of resistive ballasting substantially increases drive voltage and power consumption for a given current density.

Accordingly, there exists a need for a method of providing uniform emission current from a group of electron emitters. Additionally, there exists a need for a method of ballasting a field emission device without the use of resistive ballasting.

Figure 1:
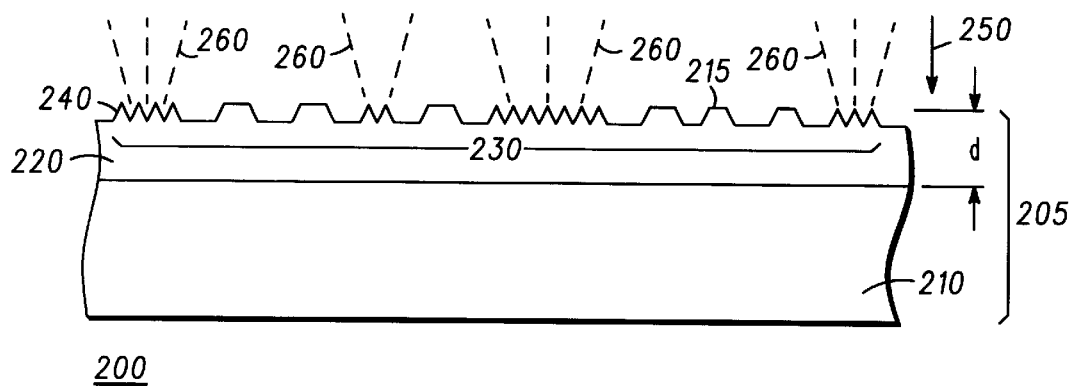
FIG. 1 is a cross-sectional view of a structure with surface material containing edge termination states.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

DESCRIPTION OF THE PREFERRED EMBODIMENT

An embodiment of the invention is for a method of providing uniform emission current using resonant tunneling emission of electrons. A method of the invention has numerous advantages. An advantage of providing uniform emission current is that uniform emission current allows uniform brightness between pixels in a field emission display. An advantage of providing uniform emission current using resonant tunneling emission of electrons is that a lower gate extraction voltage is required for a given emission current. The lower gate extraction voltage required provides for a reduction in the power consumption of a field emission device and avoids the discharge of contaminating ions associated with higher gate extraction voltages. Yet, another advantage of the method of the invention is the elimination of the need for resistive ballasting. This reduces the processing costs associated with fabricating a field emission device.

Resonant tunneling emission of electrons results when a surface state enhances electron tunneling probability for a given electric field. This allows a larger emission current for a given electric field. Resonant tunneling emission of electrons can create a decrease in the increase of emission current of a composite current voltage characteristic of a plurality of electron emitters. Plotting average applied electric field versus emission current density for a field emission device generally creates the composite current voltage characteristic. Plotting voltage versus emission current for a field emission device also creates the composite current voltage characteristic. When the field emission device is operated past the decrease in the increase of emission current as shown in the composite current voltage characteristic, uniform emission current is provided from the plurality of electron emitters.

In order to achieve resonant tunneling emission of electrons, a plurality of electron emitters having a surface material with surface states is required. An embodiment of a material that is capable of resonant tunneling emission of electrons and providing uniform emission current is shown in FIGS. 1–4.

FIG. 1 is a cross-sectional view of a field emission device 200 containing a structure 205 with a surface material 220. Structure 205 contains a bulk material 210 disposed below surface material 220. Surface material 220 has a thickness (d) that is less than 100 angstroms and contains $sp^2$ bonded and $sp^2$ like bonded atoms such as carbon, boron, nitrogen, and the like. Surface material 220 also contains surface states. Surface states can include edge termination states 230. Edge termination states 230 arise from a specific arrangement of atoms within surface material 220, which lead to a localized electronic state than enhances resonant tunneling emission of electrons 260 in the presence of an electric field 250.

Figure 2:
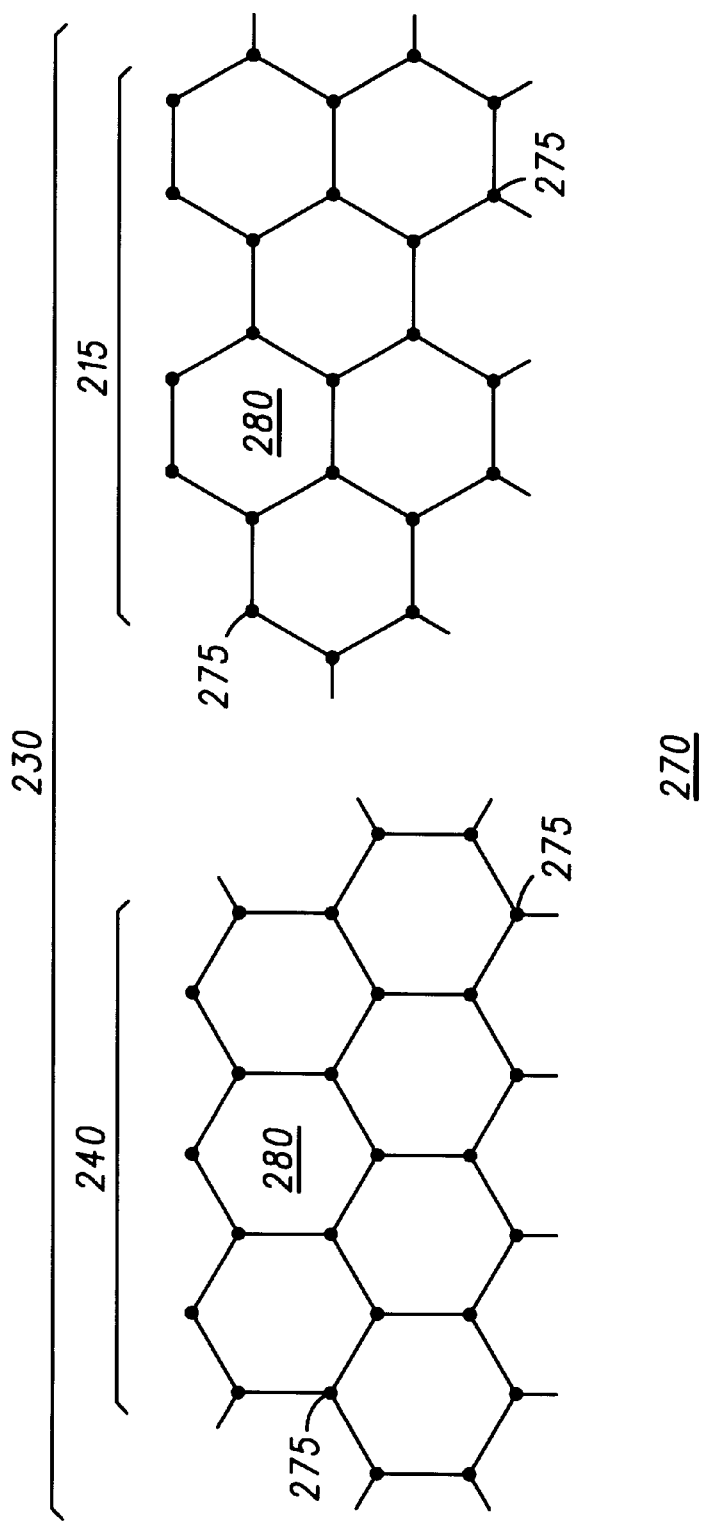
FIG. 2 shows an atomic structure.

FIG. 2 shows an atomic structure 270 where atoms 275 have a hexagonal lattice structure 280 that have edge termination states 230. Atoms 275 can be carbon, boron, nitrogen, or any atoms bonded by $sp^2$ bonds or $sp^2$ like bonds. Edge termination states 230 can have zigzag edges 240 or armchair edges 215.

Referring to FIG. 1, edge termination states 230 can be an irregular pattern of zigzag edges 240 and armchair edges 215, although this is not a limitation of the present invention. When hexagonal lattice structure 280 is present, resonant tunneling emission of electrons 260 occurs in portions of edge termination states 230 that contain zigzag edges 240 and not in those that contain armchair edges 215. Theoretical support for the existence of zigzag edges 240 and armchair edges 215 can be found in "Edge State In Graphene Ribbons: Nanometer Size Effect And Edge Shape Dependence" by K. Nakada, et al., *Physical Review B*, The American Physical Society, vol. 54, no. 24, Dec. 15, 1996.

Figure 3:
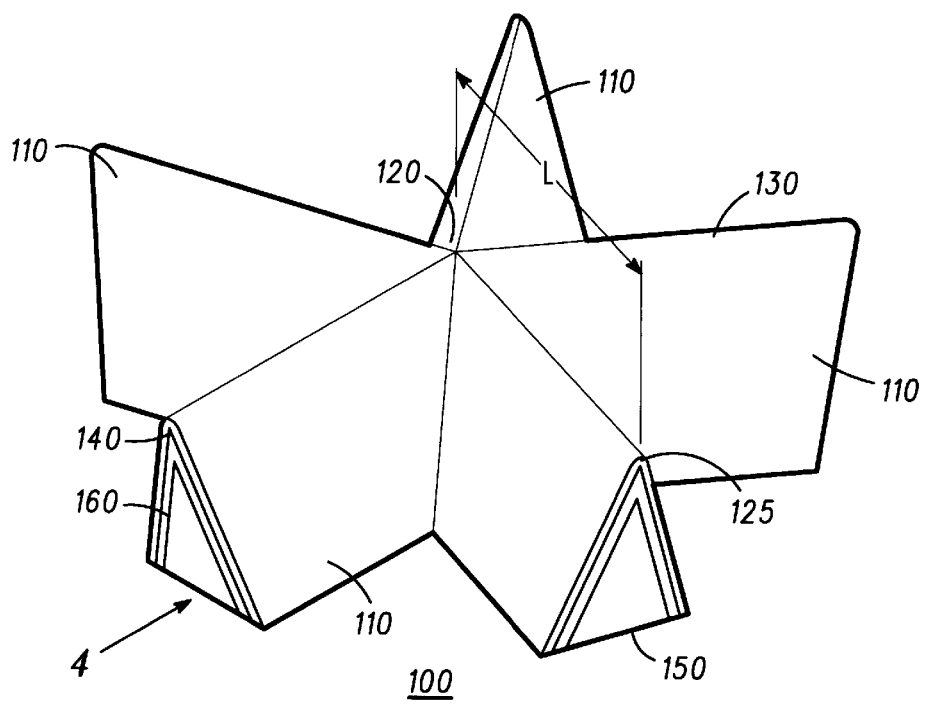
FIG. 3 shows an emissive cluster of an electron-emissive film.

FIG. 3 shows an emissive cluster 100 of an electron-emissive film. Emissive cluster 100 contains structure 205 having surface material 220 with edge termination states 230 (see FIG. 1). Electron-emissive film has a uniform distribution of emissive clusters, such as emissive cluster 100. These emissive clusters largely define the surface morphology of electron-emissive film.

As illustrated in FIG. 3, emissive cluster 100 is generally star-shaped and has a plurality of dendrites or dendritic platelets 110, each of which extends generally radially from a central point 120. The configuration of emissive cluster 100 of FIG. 3 is representative of emissive clusters, but the exact number and configuration of the dendrites is not limited to that shown in FIG. 3.

Each dendrite 110 has a narrow end 140 and a broad end 150. At narrow end 140, each dendrite 110 has a ridge 130, which extends along the length (L) of dendrite 110. The length (L) of dendrite 110 extends from central point 120 to a terminal end 125 and for example ranges from 50–400 nanometers (nm). Preferably, the length (L) of dendrite 110 is about 200 nm. Ridge 130 has a radius of curvature, which is less than 10 nm, preferably less than 2 nm. Ridge 130 contains structure 205 having surface material 220 and edge termination states 230 as shown in FIGS. 1 and 2.

Figure 4:
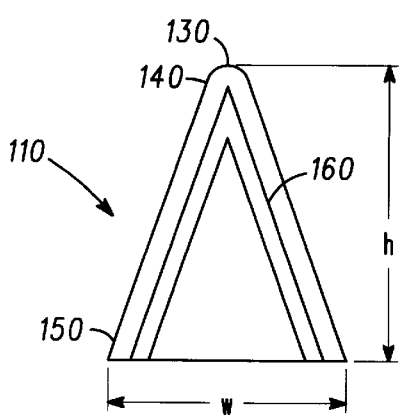
FIG. 4 is an edge view of the electron-emissive film of FIG. 3, taken along the section line 4—4.

FIG. 4 is an edge view of the electron-emissive film of FIG. 3, taken along the section lines 4—4. Each of dendrites 110 has a transverse height (h), which is equal to the distance between broad end 150 and narrow end 140. The height (h) is preferably about 100 nm. Each of dendrites 110 extends from broad end 150 to narrow end 140 in a direction away from the plane of the electron-emissive film. This configuration results in electrons being emitted in a direction away from the plane of the electron-emissive film. A width of dendrite 110 at broad end 150 is labled w, and equal to about 7 nm.

Electron-emissive film of FIGS. 3 and 4 further have a plurality of sheets 160. Sheets 160 have spacing within a range of 0.342–0.350 nm. Sheets 160 extend from broad end 150 to narrow end 140 to define dendrite 110. The upper sections of sheet 160 contain an atomic structure 270 as shown in FIG. 2.

The electron-emissive film can also be composed of boron and nitrogen. Further, the boron and nitrogen can be doped with carbon. In particular, electron-emissive film can be turbostratic boron and nitrogen doped with carbon, or alternatively, turbostratic boron and nitrogen doped with some other element that, when included in the film, can make the film electrically conductive.

Figure 5:
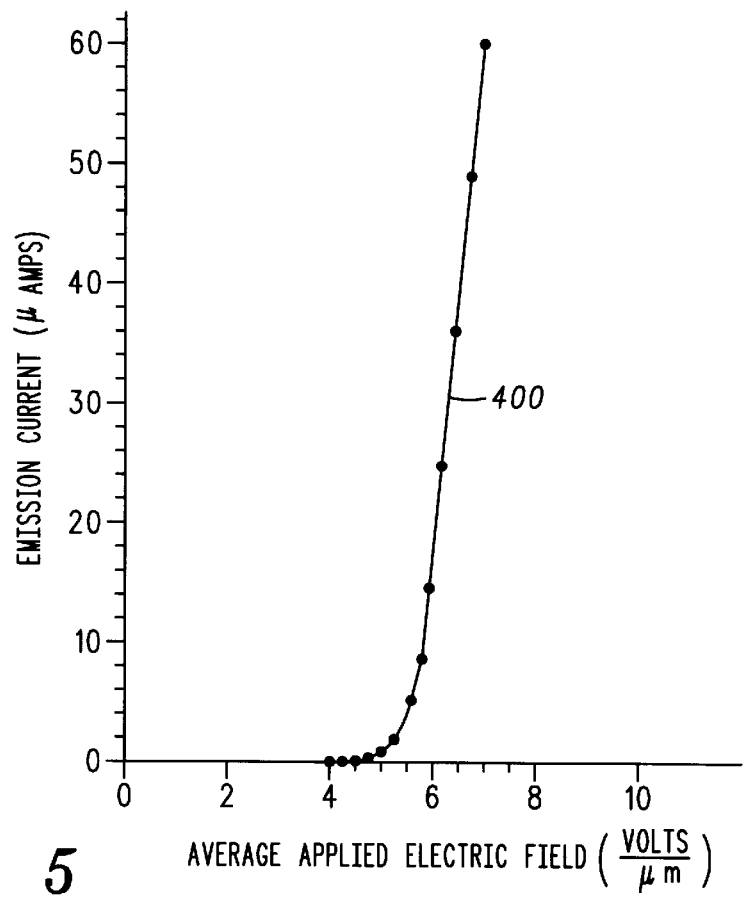
FIG. 5 is a graphical representation of electron emission current versus average electric field.

FIG. 5 is a graphical representation 400 of emission current versus average applied electric field for an electron-emissive film with emissive clusters 100. The horizontal axis is average applied electric field in volts per micrometer (V/$\mu$m), and the vertical axis is emission current in microamps ($\mu$A). The range of average applied electric fields, over which the electron-emissive film becomes emissive, has a range of about 4–7 V/$\mu$m. Because the activation and deactivation of electron emission requires switching over a narrow range of electric field strengths, a field emission device utilizing the electron-emissive film with emissive clusters 100 has power consumption requirements and driver costs that are lower than those of the prior art.

Figure 6:
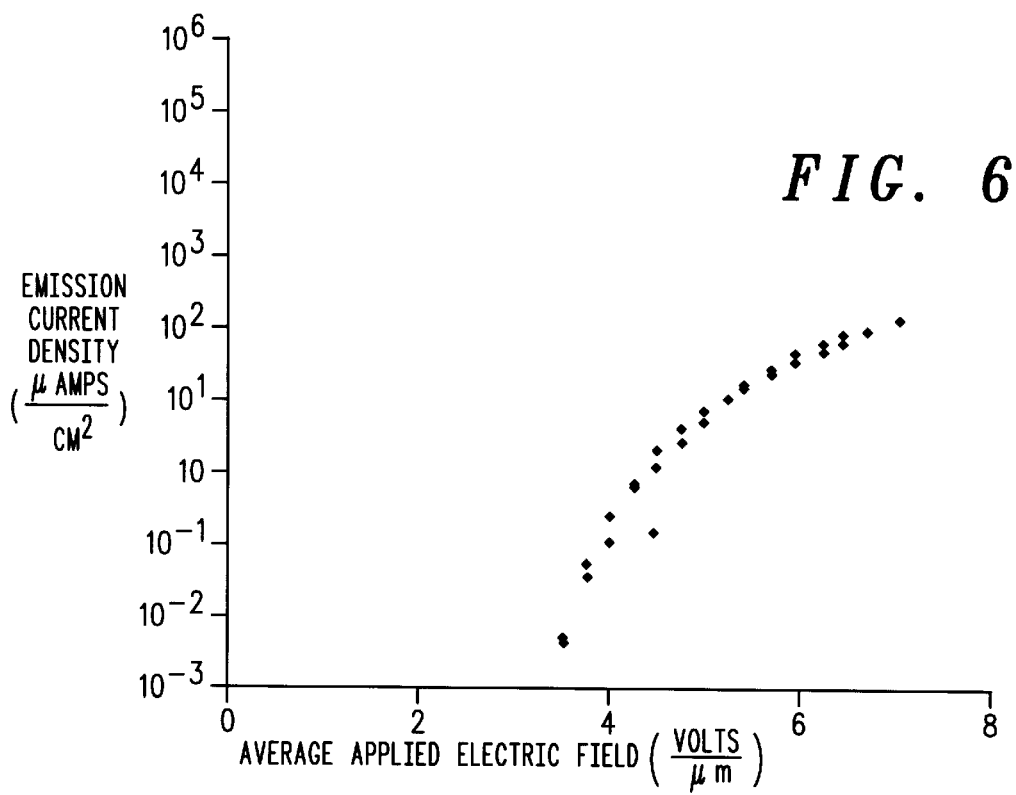
FIG. 6 is a graphical representation of a composite current voltage characteristic for an electron-emissive film.

FIG. 6 is a graphical representation of emission current density versus average applied electric field for electron-emissive film with emissive clusters 100. The horizontal axis is average applied electric field in V/$\mu$m, and the vertical axis is emission current density in microamps per square centimeter ($\mu$A/cm$^2$). Those skilled in the art will recognize the plot as suggestive of tunneling phenomena. At higher emission currents and average applied electric fields, emission current increases more slowly than predicated by the Fowler-Nordheim tunneling equation. This is consistent with resonant tunneling emission of electrons 260.

Electron-emissive film, which contains emissive clusters 100, is deposited as a blanket film on a silicon substrate. After electron-emissive film is formed on the silicon substrate, a current meter (a pico-ammeter) is connected to electron-emissive film. An anode is positioned parallel to electron-emissive film. The anode is made from a plate of glass, upon which is deposited a patterned layer of indium tin oxide (ITO). A phosphor made from zinc oxide is electro-deposited onto the patterned ITO. The distance between the anode and electron-emissive film is 0.200 mm. A voltage source is connected to the anode. The pressure within the apparatus is about 10$^{-6}$ Torr.

The data points of the emission current response of FIGS. 5 and 6 are generated as follows. First, a potential of zero Volts is applied to the anode, and the emission current is measured using the pico-ammeter connected to the cathode. Then, the potential at the anode is increased by +50 Volts, and the current is again measured at the cathode. The potential at the anode is increased by +50 Volt increments, until a voltage of 1400 Volts is reached. At each voltage increment, the emission current is measured at the cathode. The potential at electron-emissive film is maintained at zero Volts for all measurements. The average electric field is given by the ratio of: (1) the difference between the potentials at electron-emissive film and the anode and (2) the distance between electron-emissive film and the anode. The emission area of electron-emissive film is equal to the portion of the total area of electron-emissive film, from which the measured current is extracted. The emission area is defined as being equal to the area of overlap of electron-emissive film with the opposing anode area. In the particular example of FIGS. 5 and 6 the emission area, as defined by the overlap area, is equal to 0.45 cm$^2$.

A field emission device that provides resonant tunneling emission of electrons 260 is not limited to emissive cluster 100 described above. The invention can be embodied by any field emission device 200 having structure 205 with surface 220 including atomic structure 270 having edge termination states 230.

Figure 7:
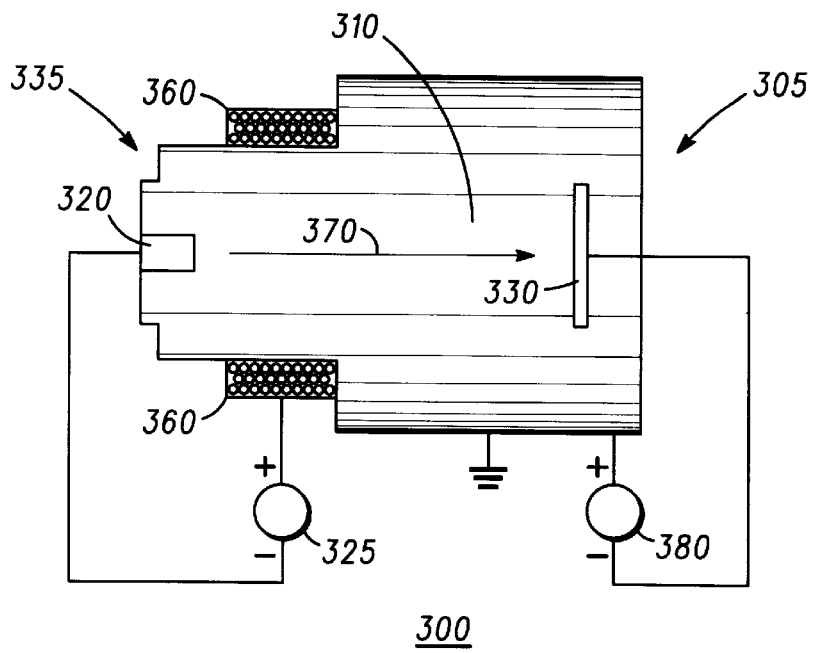
FIG. 7 illustrates a deposition apparatus useful for making an electron-emissive film.

FIG. 7 is a schematic representation of a deposition apparatus 300 useful for making an electron-emissive film. Deposition apparatus 300 is an electric arc vapor deposition system. It is emphasized that FIG. 7 is only a diagrammatic representation of such a system, which illustrates those basic portions of an electric arc vapor deposition system that are relevant, and that such diagram is by no means complete in detail. For a more detailed description of electric arc vapor deposition systems and various portions thereof, one may refer to the following U.S. Pat. No. 3,393,179 to Sablev, et al., U.S. Pat. No 4,485,759 to Brandolf, U.S. Pat. No. 4,448,799 to Bergman, et al., and U.S. Pat. No. 3,625,848 to Snaper. To the extent than such additional disclosure is necessary, the disclosures and teachings of such patents are hereby incorporated by reference.

Deposition apparatus 300 includes a vacuum chamber 305, which defines an interspace region 310. A deposition substrate 330 is disposed at one end of interspace region 310. Deposition substrate 330 can be made from silicon, soda lime glass, borosilicate glass, and the like. A thin film of aluminum and/or amorphous silicon can be deposited on the surface of the substrate. At an end opposite to substrate 330 within interspace region 310 is a deposition source 320, which is used to generate a deposition plasma 370. The deposition surface of deposition substrate 330 is located along a line-of-sight from deposition source 320. Vacuum chamber 305 further includes a duct portion 335, around which copper coils are wound to form a simple electromagnet 360. A first voltage source 325 is connected to deposition source 320. A second voltage source 380 is connected to deposition substrate 330.

First voltage source 325 is used to form an electric arc at deposition source 320. The electric arc operates on deposition source 320 to vaporize it and form deposition plasma 370. Deposition source 320 is electrically biased to serve as a cathode. An arc-initiating trigger element (not shown) is positioned proximate to deposition source 320 and is positively biased with respect to deposition source 320, so that it serves as an anode. The trigger element is momentarily allowed to engage the surface of deposition source 320, establishing a current flow path through the trigger and deposition source 320. As the trigger element disengages from deposition source 320, an electrical arc forms between the electrodes. Homogeneity of the deposited film is improved by applying a magnetic field with electromagnet 360 for controlling the movement of the arc over the surface of deposition source 320.

Electron-emissive film is formed using deposition apparatus 300. A hydrogen carrier gas is introduced into interspace region 310 to provide a pressure within interspace region 310 of about 1 Torr. Deposition substrate 330 is a silicon wafer. Deposition source 320 is a piece of high-purity, nuclear-grade graphite having a purity within a range of 99.999–100 percent graphite. The distance between deposition source 320 and deposition substrate 330 is about 10 cm. The magnetic field strength at the source for electromagnet 360 is about 0.03 Tesla. The current of the electric arc is about 100 amperes. Second voltage source 380 provides an induced DC voltage of about 100 Volts at deposition substrate 330. Deposition substrate 330 is cooled using a hollow copper plate (not shown), through which water flows, maintaining a substrate temperature of about 100 degrees Centigrade (° C.). This temperature is compatible with substrate materials, such as soda lime glass, which is used in the fabrication of field emission devices. Using the deposition conditions described above, a electron emissive film including emissive clusters 100 having a thickness of about 0.15 $\mu$m is deposited on deposition substrate 330.

Figure 8:
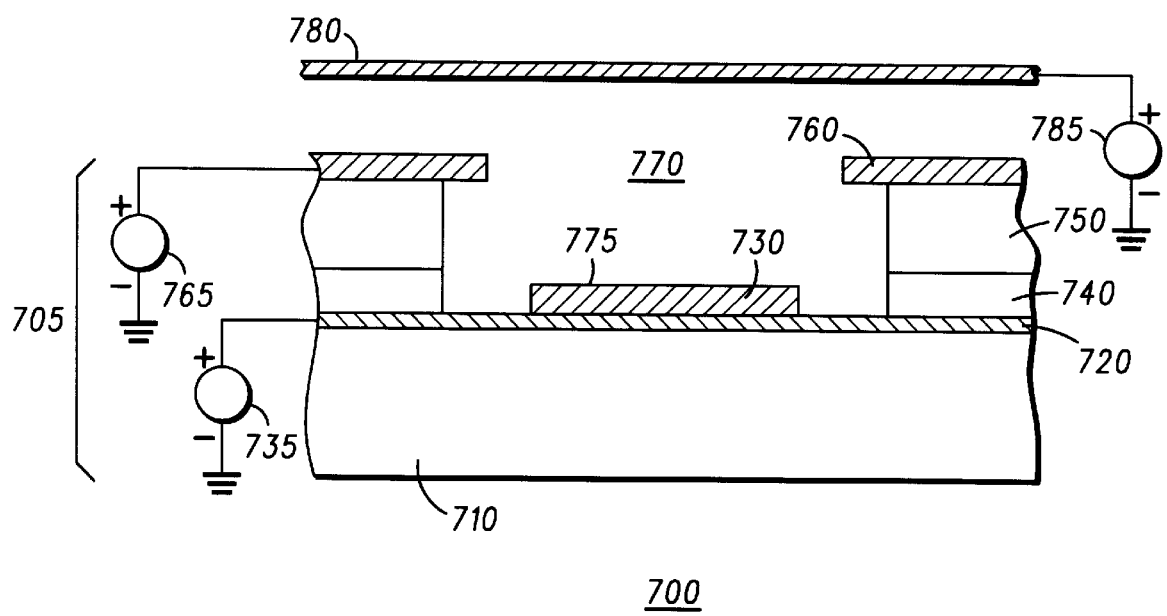
FIG. 8 is a cross-sectional view of an embodiment of a field emission device.

FIG. 8 is a cross-sectional view of a field emission device (FED) 700. FED 700 includes a cathode 705 and an anode 780, which is disposed in spaced relationship to cathode 705. Cathode 705 has an electron-emissive film 730. It is desired to be understood that the use of the electron-emissive film is not limited to that described with reference to FIG. 8.

Cathode 705 is made by first providing a supporting substrate 710, which is made from a suitable material, such as glass, silicon, or the like. A conductive layer 720 is deposited on supporting substrate 710 using standard deposition techniques. Then, a field shaper layer 740 is deposited on conductive layer 720. Field shaper layer 740 is made from a doped silicon. The dopant can be boron, and an exemplary dopant concentration is $10^{18}$ dopant species per cm$^3$. Thereafter, a dielectric layer 750 is formed on field shaper layer 740. Dielectric layer 750 can be made from silicon dioxide. A gate extraction electrode layer 760, which is made from a conductor such as, molybdenum, is deposited onto dielectric layer 750. An emitter well 770 is formed by selectively etching into layers 760, 750, 740. Emitter well 770 has a diameter of about 4 micrometers ($\mu$m) and a depth of about 1 $\mu$m.

The etched structure is then placed within a cathodic arc deposition apparatus, and electron-emissive film 730 is deposited, in the manner described with reference to FIG. 7. Electron-emissive film 730 is selectively deposited, as by using a mask, onto conductive layer 720 within emitter well 770. The thickness of electron-emissive film 730 is preferably between 0.01–0.5 $\mu$m.

A first voltage source 735 is connected to conductive layer 720. A second voltage source 765 is connected to gate extraction electrode layer 760. A third voltage source 785 is connected to anode 780. The operation of FED 700 includes applying suitable potentials from voltage sources 735, 765 and 785 at conductive layer 720, gate extraction electrode layer 760, and anode 780. Electrons are extracted from an emissive surface 775 of electron-emissive film 730 and travel to anode 780. Field shaper layer 740 aides in shaping the electric field in the region of emissive surface 775.

It should be understood that the field emission device 700 is not limited to the electron-emissive film 730 shown in FED 700. Other electron emissive structures can be used in FED 700. For example, Spindt tips, metallic nanoprotrusions, nanotubes, and the like, that contain structure 205 having a surface material 220 which includes an atomic structure 270 having edge termination states 230 are considered within the scope of the invention.

A method for emitting electrons includes the step of applying an electric field 250 to a structure 205. Structure 205 has a surface material 220 which includes an atomic structure 270 having edge termination states 230, which cause resonant edge tunneling emission of electrons 260. Thereafter, electrons are conducted through bulk material 210 that is disposed below surface material 220 of structure 205. Thereafter, a resonant tunneling energy region is established within the range of 2 electron volts above and 15 electron volts below the Fermi energy level, although this range is not a limitation of the present invention.

Figure 9:
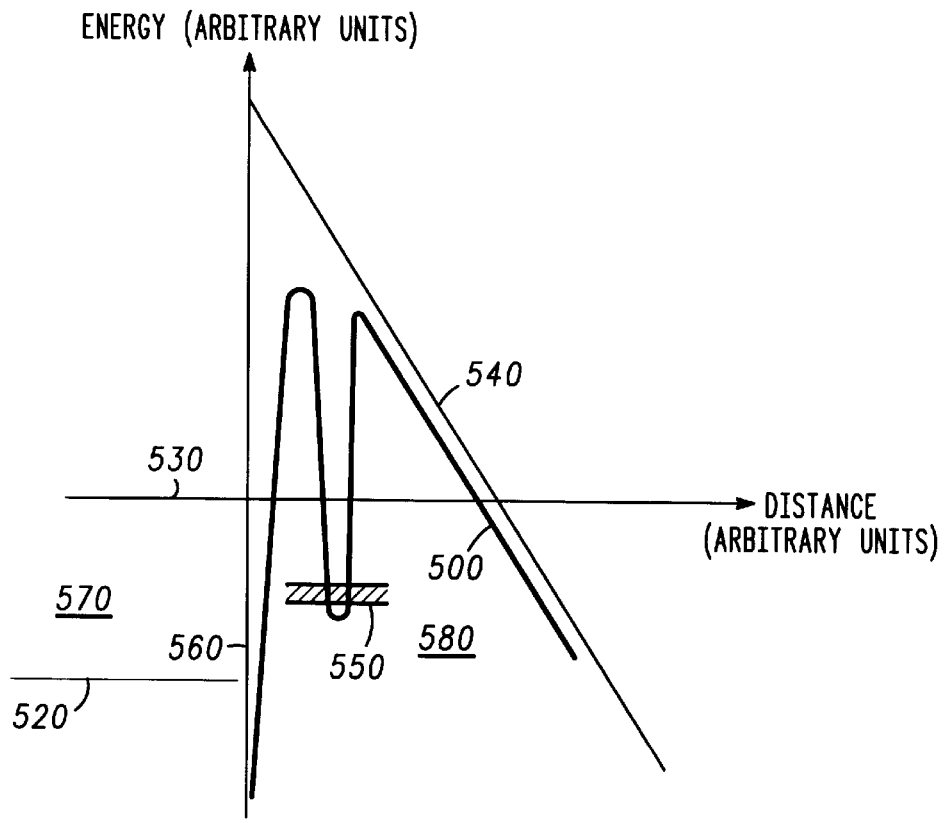
FIG. 9 is a graphical representation of an energy band diagram providing uniform emission current.

FIG. 9 is a graphical representation of an energy band diagram for a field emission device. The horizontal axis is distance from electron emitter surface 560, and the vertical axis is electron energy. Those skilled in the art will recognize the graphical representation as indicative of resonant tunneling emission of electrons 260. FIG. 9 graphically plots potential energy barrier 500 and electrostatic potential 540 associated with applied electric field 250. On the left side of the energy axis, FIG. 9 represents an emitter material 570 with Fermi energy level 530 and conduction band edge 520. On the right side of the axis, FIG. 9 represents free space 580. Free space 580 can be a vacuum, partial vacuum, and the like. Potential energy barrier 500 represents the energy of an electron at a given distance from emitter surface 560. Resonant tunneling of electrons is represented by resonant tunneling energy region 550, which arises because of the dip in the potential energy barrier curve 500. Resonant tunneling energy region 550 can be above or below Fermi energy level 530. When a resonant tunneling energy region 550 is present, the tunneling probability of electrons increases at a given distance from emitter surface 560. This allows a larger amount of electrons to emit from emitter surface 560, which effectively provides a larger emission current for a given electric field 250.

A method for providing uniform emission current from a plurality of electron emitters includes the steps of applying an electric field 250 to a plurality of electron emitters having a surface material having surface states, which provides resonant tunneling emission of electrons. Thereafter, operating the plurality of electron emitters beyond the decrease in the increase of emission current as shown in the composite current voltage characteristic formed by plurality of electron emitters.

In a method of providing uniform emission current, surface states can be formed through the adsorption of molecules on plurality of electron emitters. Electron emitters operating in a resonant tunneling energy region 550 produce larger emission currents for a given electric field 250 than electron emitters that do not operate in a resonant tunneling energy region 550. High emission currents or high electric fields can excite adsorbate bonds which can cause desorption of molecules from plurality of electron emitters. Desorption of molecules disrupts resonant tunneling emission of electrons and eliminates resonant tunneling energy region 550, thereby reducing emission current. The disruption of the resonant tunneling emission of electrons in at least one of the plurality of electron emitters causes a decrease in emission current and a decrease in the increase of emission current as shown in the composite current voltage characteristic.

As an example, resonant tunneling emission of electrons can result when a molecule such as oxygen, hydrogen, and the like is chemisorbed on the surface of an electron emitter causing a surface state. Upon application of electric field 250, electron emitter can be operating in a resonant tunneling energy region 550. Resonant tunneling emission of electrons resulting from a chemisorbed molecule can be disrupted through desorption of the molecule on at least one of the plurality of electron emitters. Desorption of the molecule can occur when emission current or electric field 250 excites chemical bonds between chemisorbed molecule and emitter material. If the resonant tunneling energy region 550 is below the Fermi energy level 530, the electron emitter will become hotter as low energy electrons are removed.

Figure 10:
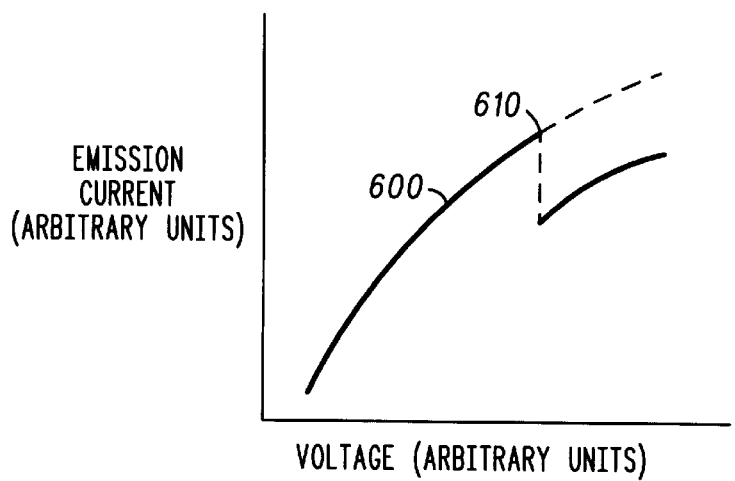
FIG. 10 is a graphical representation of a current voltage characteristic for a single electron emitter.

FIG. 10 is a graphical representation of a current voltage characteristic for a single electron emitter 600. The horizontal axis is voltage (V), and the vertical axis is emission current (I). When local electron emitter conditions provide enough energy for desorption, chemisorbed molecule is removed and resonant tunneling emission of electrons is disrupted 610 as shown in FIG. 10. For example, the conditions required for desorption of an oxygen or hydrogen molecule can be substantially equal to a thermal excitation of 700 degrees Kelvin (°K) for about 5 seconds.

Figure 11:
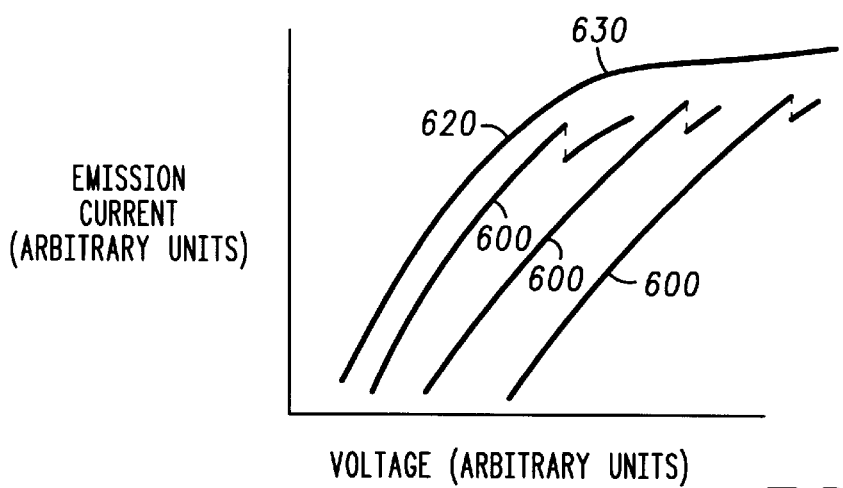
FIG. 11 is a graphical representation of a composite current voltage characteristic providing uniform emission current.

FIG. 11 is a graphical representation of a composite current voltage characteristic 620 with a decrease in the increase of emission current 630. The horizontal axis is voltage (V), and the vertical axis is emission current (I). Also shown in FIG. 11 are graphical representations of current voltage characteristics of single electron emitters 600 that make up composite current voltage characteristic 620. Composite current voltage characteristic 620 is obtained by combining each of the current voltage characteristics for individual electron emitters 600. Disruption of resonant tunneling emission of electrons 610 of at least one of the plurality of electron emitters causes composite current voltage characteristic 620 to have a decrease in the increase of emission current 630. Operation of plurality of electron emitters beyond the decrease in the increase of emission current 630 as shown in the composite current voltage characteristic 620 provides a more uniform emission current. Operation of electron emitters utilizing resonant tunneling emission of electrons has the benefit of reducing power consumption of a field emission device. Another benefit is a more uniform emission current. A uniform emission current has the advantage of providing uniform brightness between pixels in a field emission display. Yet another advantage of uniform emission current is the reduction or elimination of resistive ballasting layers required in prior art field emission devices.

Figure 12:
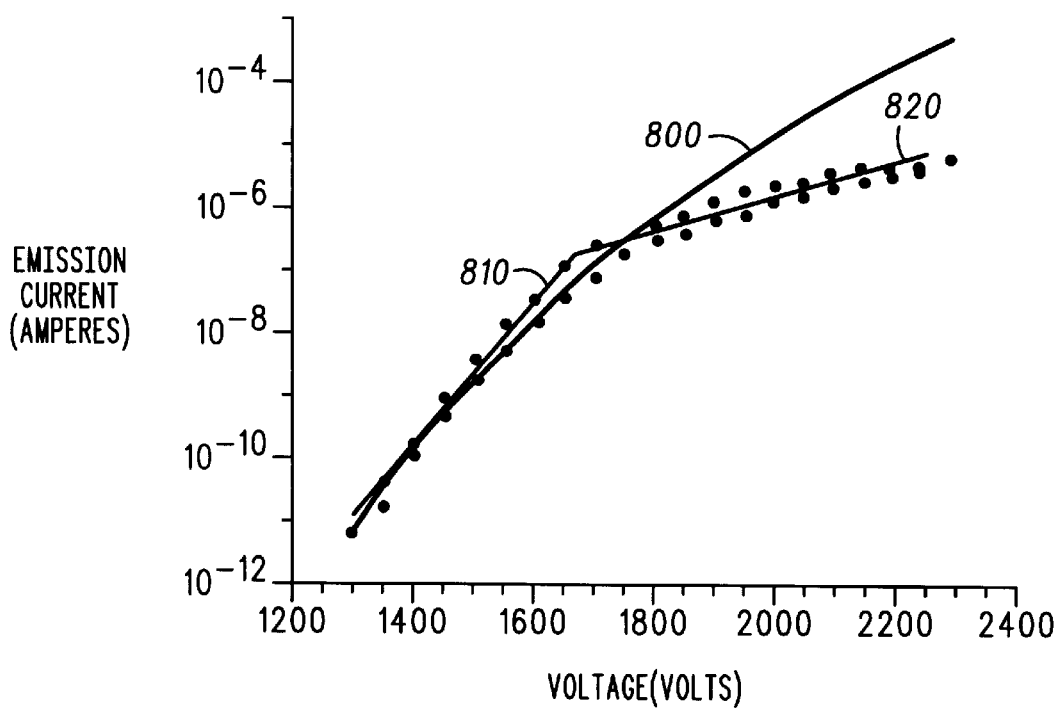
FIG. 12 is another graphical representation of a composite current voltage characteristic providing uniform emission current.

FIG. 12 is a graphical representation of emission current versus voltage for a plurality of electron emitters, which includes desorption of chemisorbed molecules. The horizontal axis is voltage in Volts (V), and the vertical axis is emission current in Amperes (A). Experimental points are plotted and line segments 810 and 820 represent best fitting straight lines through the data points. Line segment 800 corresponds to predicted Fowler-Nordheim tunneling behavior based on data below 1700 Volts. Deviation of data above 1700 Volts from predicted Fowler-Nordheim behavior is a result of desorption and indicative of disruption of resonant tunneling emission of electrons in a portion of plurality of electron emitters. The non-linear arrangement of data points and the decrease in the increase of emission current with increasing voltage over the experimental range is suggestive of resonant tunneling emission of electrons.

The apparatus employed to generate the emission current versus voltage response of FIG. 12 is a standard field emission microscope consisting of a glass envelope, a conductive phosphor coated face plate anode and a cathode. The cathode support is a standard filament thermoinic source on a ceramic base, which is typically used in scanning electron microscopes. An electron-emissive film is affixed to cathode support filament with a trace of carbon paint to form the cathode. A current meter (a pico-ammeter) is connected to the cathode and a high voltage source is connected to the anode. The distance between the cathode and anode is 5 cm. The pressure within the apparatus is about $10^8$ Torr.

The data points of the emission current response of FIG. 12 are generated as follows. First, a potential of zero Volts is applied to the anode, and the emission current is measured using the pico-ammeter connected to the cathode. Then, the potential at the anode is increased by +50 Volts, and the current is again measured at the cathode. The potential at the anode is increased by +50 Volt increments, until a voltage 2300 Volts is reached. At each voltage increment, the emission current is measured at the cathode. The potential at the cathode is maintained at zero Volts for all measurements.

The scope of the invention is not limited to disruption of resonant tunneling emission of electrons. When chemical bonds between adsorbed molecules and emitter material 570 are energetically excited with energies lower than those required for desorption, resonant tunneling energy region 550 can be altered. Resonant tunneling energy region 550 can shift to a higher energy, or the position of resonant energy level 550 can increase in distance from the emitter surface 560. In both cases, altering the resonant tunneling energy region 550 reduces the tunneling probability, and therefore, reduces emission current for a given electric field 250. Analogous to disrupting resonant tunneling emission of electrons, altering resonant tunneling energy region 550 causes a decrease in the increase of emission current 630 as shown in the composite current voltage characteristic 620 illustrated in FIG. 11.

In accordance with another embodiment of providing uniform emission current, surface states can be formed from electron emissive films having nanotubes, and the like. It is known in the art to produce field emission of electrons from electron emissive films having nanotubes. For example, Heer, et al. describe a method of forming nanotubes oriented perpendicular to the plane of the emissive film ("A Carbon Nanotube Field-Emission Electron Source", *Science*, Volume 270, Nov. 17, 1995, pp. 1179–1180).

In accordance with yet another embodiment of providing uniform emission current, surface states can be formed from electron emissive films having metallic nanoprotrusions, and the like. It is known in the art to produce field emission of electrons from electron emissive films having metallic nanoprotrusions. For example, Binh, et al. describe a method of forming metallic nanoprotrusions ("Nanoprotrusion Model for Field Emission from Integrated Microtips", *Journal of Vacuum Science Technology*, Volume 15, Number 5, September/October 1997, pp. 1666–1677).

In accordance with still another embodiment of providing uniform emission current, surface states can be formed from electron emissive films which include structure 205 with surface material 220 containing edge termination states 230. Edge termination states 230 can have zigzag edges 240 and armchair edges 215.

Figure 13:
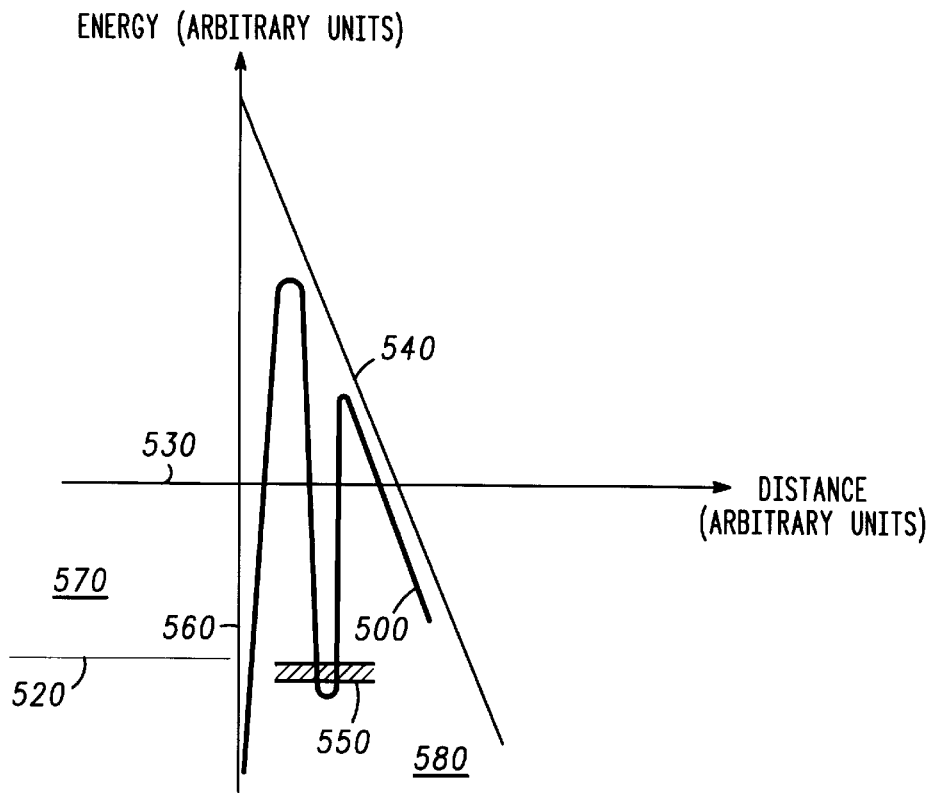
FIG. 13 is another energy band diagram providing uniform emission current.

FIG. 13 graphically illustrates yet another embodiment of providing uniform emission current. The horizontal axis is distance from electron emitter surface 560, and the vertical axis is electron energy. The emission current of an electron emitter is the product of bulk electron supply and tunneling probability. In the case of resonant tunneling emission of electrons, a large majority of emission current originates from the bulk electron supply at the resonant tunneling energy region 550. As an electric field 250 is increased, the tunneling probability is increased which causes an increase in emission current while decreasing the resonant tunneling energy region 550. When electric field 250 is increased to cause resonant tunneling energy region 550 to drop below conduction band edge 520 of emitter material 570 as shown in FIG. 13, fewer electrons are available and emission current either increases less rapidly with increasing electric field 250 or decreases with increasing electric field 250. For a plurality of electron emitters, this causes a decrease in the increase of emission current 630 as shown in the composite current voltage characteristic 620 illustrated in FIG. 11. Conduction band edge 520 is not limited to energy levels below the Fermi energy level 530. Conduction band edge 520 can be at an energy level above the Fermi energy level 530.

As shown in FIG. 13, providing uniform emission current includes the step of decreasing resonant tunneling energy region 550 of each of plurality of electron emitters as electric field 250 increases. Thereafter, supplying a bulk electron supply that diminishes at energies below a conduction band edge 520. Thereafter, applying an electric field 250, which shifts the resonant tunneling energy region 550 below the conduction band edge 520 in order to create the decrease in the increase of emission current 630 as shown in the composite current voltage characteristic 620 illustrated in FIG. 11.

Figure 14:
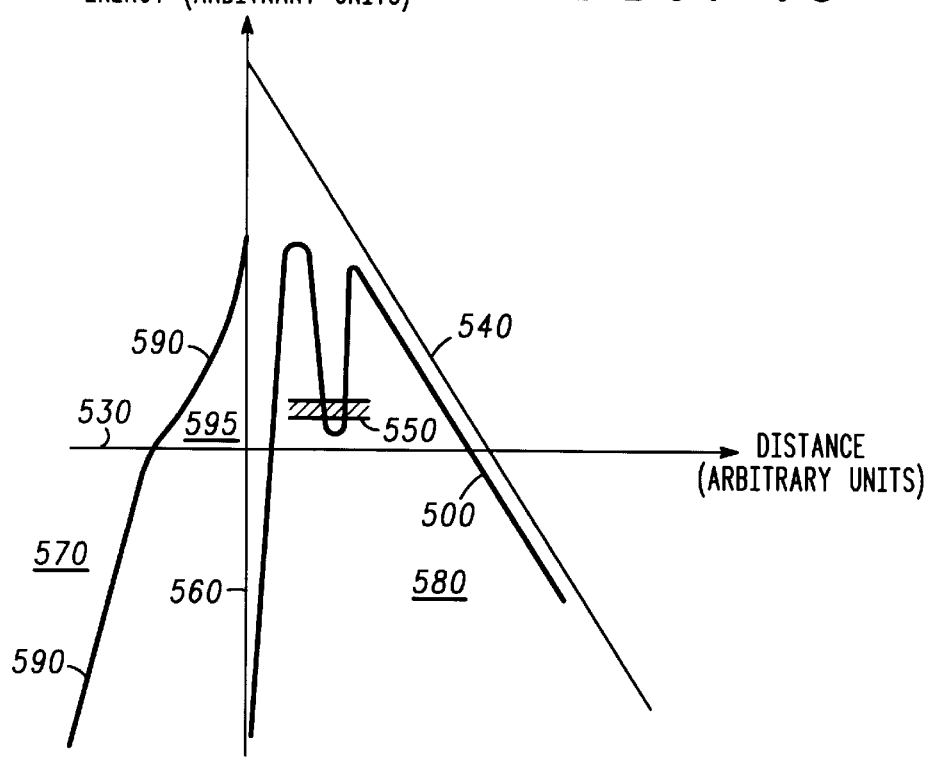
FIG. 14 is yet another energy band diagram providing uniform emission current.

FIG. 14 graphically illustrates still yet another embodiment of providing uniform emission current. The horizontal axis is distance from electron emitter surface 560, and the vertical axis is electron energy. If resonant tunneling energy region 550 lies above the Fermi energy level 530, emission current is limited since only thermalized electrons 595 are available for emission. As electric field 250 is increased, resonant tunneling energy region 550 decreases and the bulk electron supply 590 increases exponentially. Thus both electron tunneling probability and bulk electron supply 590 increase exponentially at energies approaching the Fermi energy level 530. The result is a faster increase in emission current as electric field 250 is increased compared to Fowler-Nordheim behavior. When resonant tunneling energy region 550 drops substantially below Fermi energy level 530, there is a decrease in rate of rate of increase in bulk electron supply 590. Below Fermi energy level 530, bulk electron supply 590 is reduced to increasing linearly which causes a lower rate of increase in emission current. For a plurality of electron emitters, this causes a decrease in the increase of emission current 630 as shown in composite current voltage characteristic 620 illustrated in FIG. 11.

As shown in FIG. 14, providing uniform emission current includes the step of decreasing resonant tunneling energy region 550 of each of plurality of electron emitters as electric field 250 increases. Thereafter, supplying a bulk electron supply 590 above Fermi energy level 530 that increases at energies approaching Fermi energy level 530 and decreases in rate of rate of increase substantially below Fermi energy level 530. Thereafter, applying an electric field 250, which shifts resonant tunneling energy region 550 from above Fermi energy level 530 to below Fermi energy level 530 in order to create decrease in the increase of emission current 630 as shown in composite current voltage characteristic 620 as illustrated in FIG. 11.

The embodiments described above are not limited to providing uniform emission current. The embodiments for providing uniform emission current can also be used to provide ballasting for a plurality of electron emitters. Ballasting plurality of electron emitters includes providing uniform emission current from plurality of electron emitters, limiting emission current from a portion of plurality of electron emitters, and preventing runaway emission current and associated arcing. The use of resonant tunneling emission of electrons for ballasting eliminates the need for resistive ballasting. This reduces the processing costs associated with fabricating a field emission device. The elimination of resistive ballasting also reduces drive voltage and power consumption for a given current density in a field emission device.

In summary, an embodiment of the invention is for a method of providing uniform emission current using resonant tunneling emission of electrons. A method of providing uniform emission current in accordance with the invention includes the steps of providing a plurality of electron emitters having a composite current voltage characteristic and having a surface material which includes surface states, wherein surface states provide resonant tunneling emission of electrons upon application of an electric field. Thereafter, operating plurality of electron emitters beyond a decrease in the increase of emission current as shown in the composite current voltage characteristic.

It should now be understood that the method of the invention has numerous advantages, such as lowering the gate extraction voltage required for a given emission current. This reduces the operating cost of a field emission device and avoids the discharge of contaminating ions associated with higher gate extraction voltages. Another advantage is that resonant tunneling emission of electrons provides for more uniform emission current from groups of electron emitters than the prior art. This also has the advantage of providing uniform brightness between pixels in a field emission display. Yet, another advantage is the elimination of resistive ballasting and processing steps associated with fabricating resistive ballasting. This reduces the cost of fabricating a field emission device.

We claim:

1. A method of providing a uniform emission current, comprising the steps of:
   providing a plurality of electron emitters having a composite current voltage characteristic and having a surface material which includes surface states, wherein the surface states provide a resonant tunneling emission of electrons upon application of an electric field; and
   operating the plurality of electron emitters beyond a decrease in the increase of emission current as shown in the composite current voltage characteristic.

2. The method of claim 1, wherein the step of operating the plurality of electron emitters further comprises the step of altering a resonant tunneling energy region of at least one of the plurality of electron emitters to reduce tunneling probability and create the decrease in the increase of emission current.

3. The method of claim 1, wherein the step of operating the plurality of electron emitters further comprises the step of disrupting a resonant tunneling energy region of at least one of the plurality of electron emitters to reduce tunneling probability and create the decrease in the increase of emission current.

4. The method of claim 1, wherein the step of operating the plurality of electron emitters further comprises the steps of:
   decreasing a resonant tunneling energy region of at least one of the plurality of electron emitters as the electric field increases;
   supplying a bulk electron supply that diminishes at energies below a conduction band edge; and
   applying the electric field which shifts the resonant tunneling energy region below the conduction band edge in order to create the decrease in the increase of emission current.

5. The method of claim 1, wherein the step of operating the plurality of electron emitters further comprises the steps of:
   decreasing resonant tunneling energy region of at least one of the plurality of electron emitters as the electric field increases;
   supplying a bulk electron supply above Fermi energy level that increases at energies approaching the Fermi energy level and decreases in rate of rate of increase substantially below the Fermi energy level; and
   applying the electric field which shifts the resonant tunneling energy region from above the Fermi energy level to below the Fermi energy level in order to create the decrease in the increase of emission current.

6. The method of claim 1, further comprising the step of forming the surface states from nanotubes.

7. The method of claim 1, further comprising the step of forming the surface states from metallic nanoprotrusions.

8. The method of claim 1, further comprising the step of forming the surface states from edge termination states.

9. The method of claim 8, further comprising the step of forming the edge termination states from zigzag edges.

10. The method of claim 1, further comprising the step of forming the surface states through adsorption of molecules.

11. A method of ballasting a field emission device, comprising the steps of:
   providing a plurality of electron emitters having a composite current voltage characteristic and having a surface material which includes surface states, wherein the surface states provide a resonant tunneling emission of electrons upon application of an electric field; and
   operating the plurality of electron emitters beyond a decrease in the increase of emission current as shown the composite current voltage characteristic.

12. The method of claim 11, wherein the step of operating the plurality of electron emitters further comprises the step of altering a resonant tunneling energy region of at least one of the plurality of electron emitters to reduce tunneling probability and create the decrease in the increase of emission current.

13. The method of claim 11, wherein the step of operating the plurality of electron emitters further comprises the step of disrupting a resonant tunneling energy region of at least one of the plurality of electron emitters to reduce tunneling probability and create the decrease in the increase of emission current.

14. The method of claim 11, wherein the step of operating the plurality of electron emitters further comprises the steps of:
   decreasing a resonant tunneling energy region of at least one of the plurality of electron emitters as the electric field increases;
   supplying a bulk electron supply that diminishes at energies below a conduction band edge; and
   applying the electric field which shifts the resonant tunneling energy region below the conduction band edge in order to create the decrease in the increase of emission current.

15. The method of claim 11, wherein the step of operating the plurality of electron emitters further comprises the steps of:
   decreasing a resonant tunneling energy region of at least one of the plurality of electron emitters as the electric field increases;
   supplying a bulk electron supply above Fermi energy level that increases at energies approaching the Fermi energy level and decreases in rate of rate of increase substantially below the Fermi energy level; and
   applying the electric field which shifts the resonant tunneling energy region from above the Fermi energy level to below the Fermi energy level in order to create the decrease in the increase of emission current.

16. The method of claim 11, further comprising the step of forming the surface states from nanotubes.

17. The method of claim 11, further comprising the step of forming the surface states from metallic nanoprotrusions.

18. The method of claim 11, further comprising the step of forming the surface states from edge termination states.

19. The method of claim 18, further comprising the step of forming the edge termination states from zigzag edges.

20. The method of claim 11, further comprising the step of forming the surface states through adsorption of molecules.

* * * * *